United States Patent [19]

Lewis

[11] Patent Number: 5,210,955

[45] Date of Patent: May 18, 1993

[54] CYLINDER BORE MEASURING APPARATUS

[76] Inventor: Glenn A. Lewis, 8838 W. Elm, Phoenix, Ariz. 85037

[21] Appl. No.: 850,558

[22] Filed: Mar. 13, 1992

[51] Int. Cl.5 .......................... G01B 5/12; G01B 3/16
[52] U.S. Cl. .................................. 33/558.01; 33/543; 33/558.4; 33/555.2; 33/807
[58] Field of Search ........... 33/558.01, 558.04, 558.05, 33/558.08, 558.2, 558.3, 797, 798, 799, 801, 805, 807, 808, 555.2, 555.1, 542, 543, 544, 544.3, 792, 600, 605, 794, 558.4, 783

[56] References Cited

U.S. PATENT DOCUMENTS

| | | |
|---|---|---|
| 1,219,149 | 3/1917 | Puglisi . |
| 1,221,668 | 4/1917 | Brunton ................................ 33/808 |
| 1,235,715 | 8/1917 | Mooney . |
| 1,250,259 | 12/1917 | Westlin .............................. 33/558.04 |
| 1,849,959 | 3/1932 | Schneider ............................. 33/799 |
| 4,982,505 | 1/1991 | Pocci ..................................... 33/544 |
| 5,070,623 | 12/1991 | Barnes ................................... 33/807 |

Primary Examiner—William A. Cuchlinski, Jr.
Assistant Examiner—William C. Dowling
Attorney, Agent, or Firm—Schmeiser, Morelle & Watts

[57] ABSTRACT

A unique measuring apparatus designed especially for measuring the interior diameter of cylinder bores. The apparatus includes a divider-like measuring tool that provides both a coarse measurement scale and a dial indicator to enable highly accurate measurements. The device is preferably used in combination with a slotted gauge block that is adapted to rest atop the cylinder bore. The legs of the device include perpendicularly extending support members that rest astride the slot when the device is positioned atop the gauge block. A number of different length removable leg tips are also provided to enable the measurement of cylinder diameters at different heights within the cylinder.

14 Claims, 4 Drawing Sheets

CYLINDER BORE MEASURING APPARATUS

FIELD OF THE INVENTION

The invention is in the field of measurement devices. More specifically, the invention is an apparatus for accurately measuring cylinder bores. The apparatus basically comprises a divider-like measuring device that is partially inserted within a cylinder bore. The apparatus preferably additionally includes a support block that rests atop the cylinder and is adapted to support the measuring device. The measuring device makes use of two separate measurement mechanisms to enable a user to quickly and easily determine both a coarse and fine measurement of the cylinder's inner diameter.

BACKGROUND OF THE INVENTION

There have been many measuring tools developed for accurately determining the diameter of a cylinder bore. Tools of this type normally consist of an apparatus that functions by contacting diametrically opposite points within the bore.

One common example of a tool used for measuring interior distances is a caliper. A basic caliper will normally be used in combination with a micrometer to determine a bore's diameter. A user initially positions the caliper so that the tips of its jaws span the cylinder bore and contact opposite points within the bore. The caliper is then removed from the cylinder and a micrometer is used to accurately measure the distance between the tips of the caliper's jaws.

Another tool often used for measuring inside diameters is a dial caliper. This type of tool combines a caliper with a dial indicator. The dial indicator is connected to the caliper's jaws in a manner wherein movement of the jaws causes the indicator's pointer to move. This tool enables a user to accurately determine an interior distance without the need for two separate tools.

A third device commonly used for measuring inner diameters is a tubular inside micrometer. The measuring device is fully received within the bore and a direct measurement is provided through a telescoping action of the apparatus. To increase the tool's range, extensions of known length may be added to the basic tool.

While being satisfactory for many uses, prior art measuring devices suffer certain failings. When taking a measurement deep within a bore, the prior art devices are often found to be either incapable of taking such a measurement or are extremely awkward to use. For a caliper-like device, the body of the tool must remain exterior to the cylinder bore at all times. Devices such as the tubular micrometer often cannot be placed or maintained in a proper position relative to the cylinder axis to enable accurate measurement. These difficulties are often magnified when a number of different readings are required to determine if the cylinder has become tapered, damaged or unevenly worn in some other manner.

The prior art devices are also difficult to use by a novice and require a significant training period. Even when an accomplished professional uses one of the prior art devices,, repeated measurements may yield different readings.

Another problem with the prior art devices is that one must guess where to properly place the tool to enable an accurate measurement of the bore's diameter. This can be a laborious process and sometimes results in the user measuring a chord of the bore in lieu of its true diameter.

SUMMARY OF THE INVENTION

The invention is a measurement apparatus that enables a user to quickly and easily determine the inner diameter of a cylinder bore. The apparatus can be adapted to enable measurements at one or more spaced locations along the longitudinal axis of the bore.

The apparatus is initially used to determine the proper placement of the apparatus to measure the cylinder diameter. Once properly positioned, the apparatus is used to quickly and easily measure the diameter.

The invention makes use of a specially designed divider-like measurement tool to achieve a high degree of accuracy when making diameter measurements. The legs of the tool are adapted to partially pass through the slot of a complementary support block that can rest securely atop the cylinder. When the block is properly positioned, the slot diametrically extends across the cylinder bore. Once the tool is received within the block, the tool's legs are moved apart relative to each other until their outer tips contact opposite points within the bore. Placement of the tool atop the support block ensures that the tool will be in a level position while making the measurement.

The device includes two measurement indicating mechanisms. The first is a scale that is fitted to one of the device's legs and provides the user with a coarse measurement of the separation distance between the legs' outer tips. The second measurement mechanism is a dial indicator that is used in conjunction with the above noted scale to provide the user with a higher degree of accuracy than provided by the coarse scale. An arcuately-shaped adjustable follower is attached to one of the device's legs to actuate a movable plunger of the dial indicator. The curved shape of the follower enables the head of the follower to contact the bottom tip of the indicator plunger at any angular spacing of the legs from zero degrees (legs together) to approximately one-hundred-twenty degrees (legs forming a 120 degree included angle).

DETAILED DESCRIPTION OF THE DRAWINGS

Figure 1:
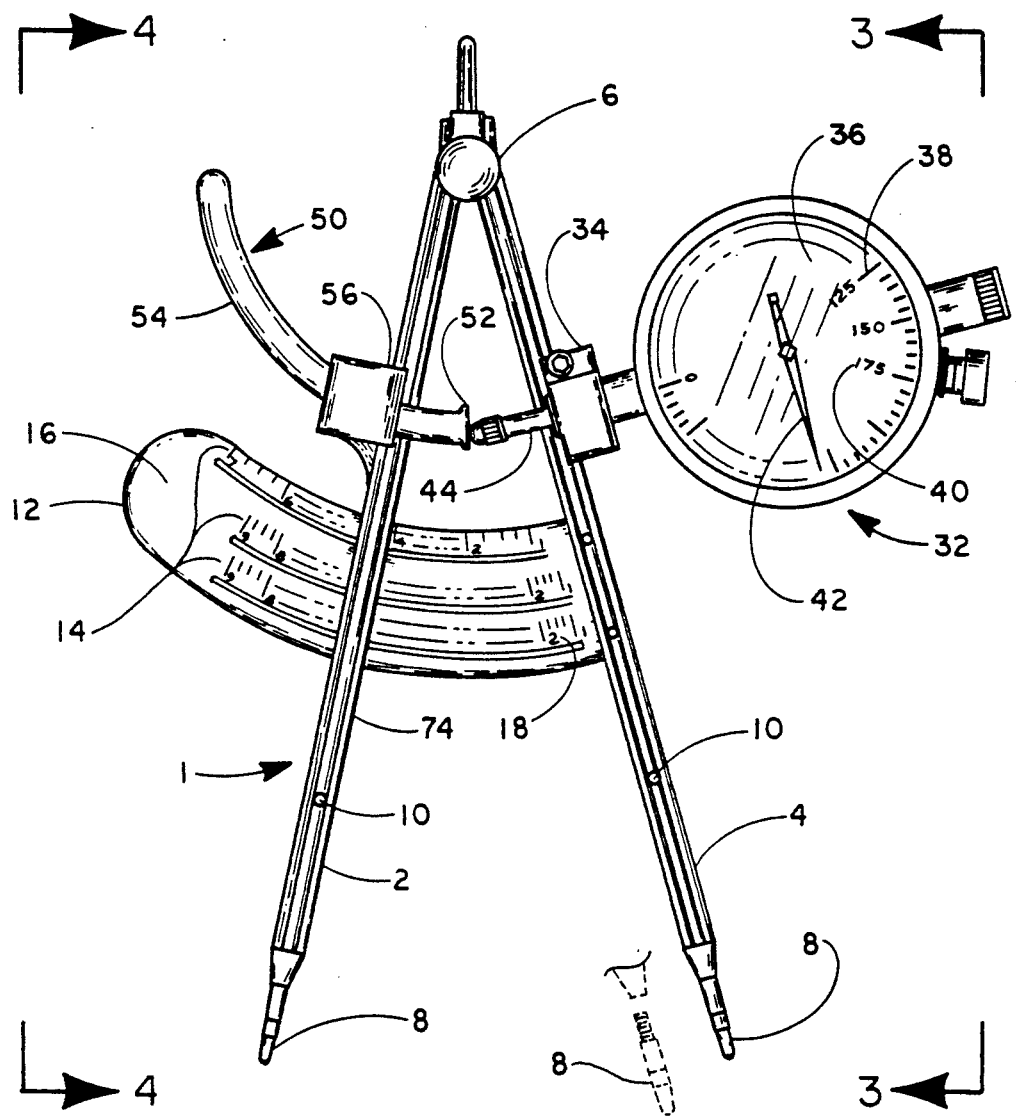
FIG. 1 provides a front view of the measurement device.
Figure 2:
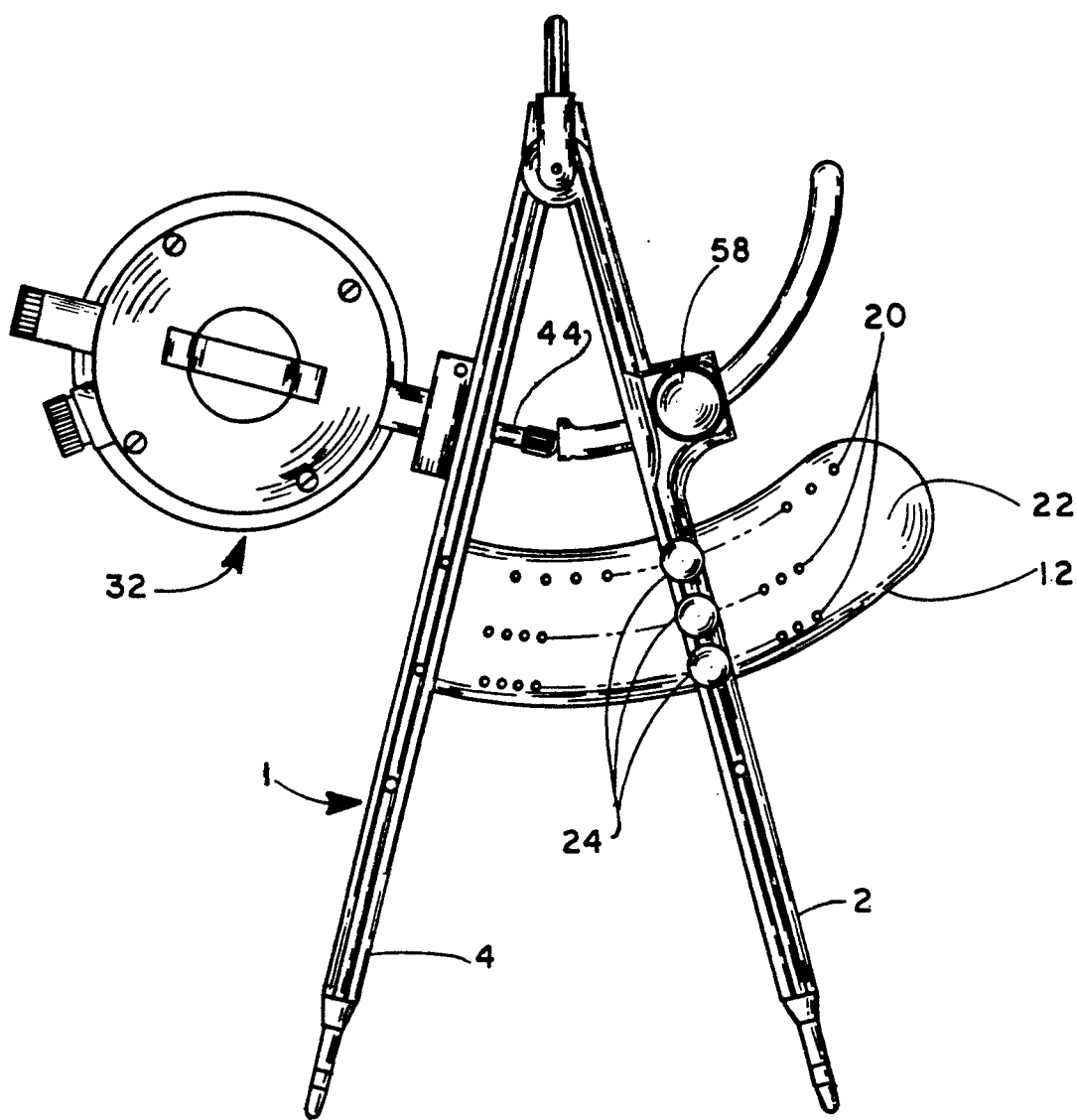
FIG. 2 provides a rear view of the device shown in FIG. 1
Figure 3:
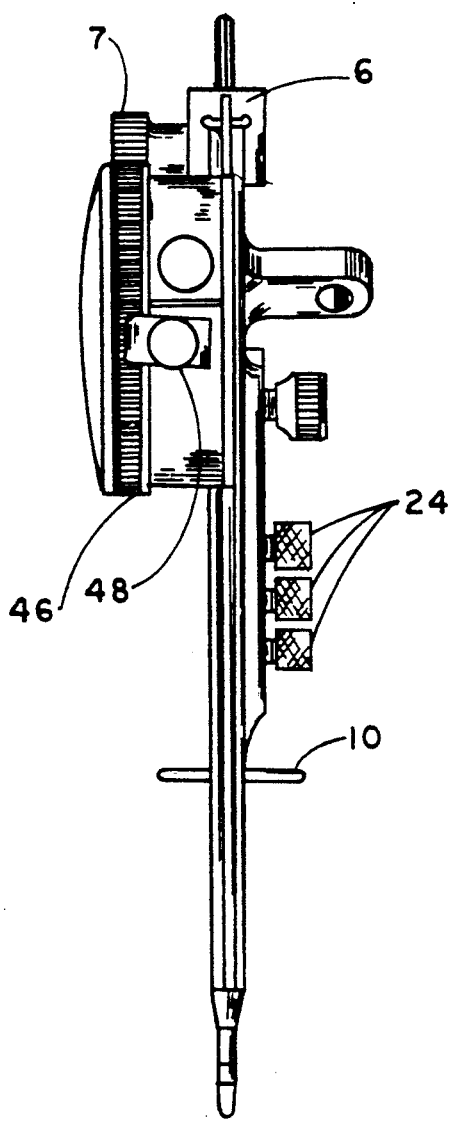
FIG. 3 provides a right side view of the device shown in FIG. 1.
Figure 4:
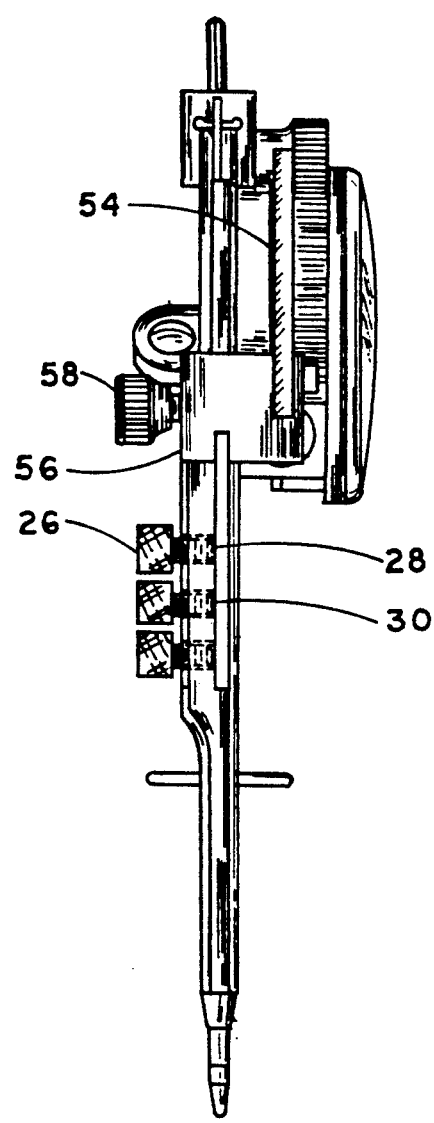
FIG. 4 provides a left side view of the device shown in FIG. 1.

Referring now to the drawings in greater detail, wherein like reference characters refer to like parts throughout the several figures, there is shown by the numeral 1 a bifurcated measurement tool in accordance with the invention.

FIGS. 1-4 provide views of the basic tool from a number of different perspectives. The device resembles a divider and includes a pair of legs, 2 and 4 that are movable relative to each other. The legs are joined together at pivot 6 located at the top of the tool. The pivot includes an adjustment screw 7 that can be loosened or tightened by the user to control the difficulty required to move the legs.

Each leg includes a removable tip 8 and a perpendicularly-oriented support pin member 10. At the bottom of FIG. 1, a bottom portion of leg 4 and a removed tip are shown in phantom.

Fixed to leg 4 is a scale member in the form of an arcuately-shaped plate 12 that extends through a slot in leg 2. A plurality of measurement scales 14 are inscribed on the plate's front face 16. Each scale is associated with a particular length leg tip and includes a plurality of spaced reference or measurement indicia 18. The plate additionally possesses a plurality of depressions 20 in its rear surface 22 (note FIG. 2). The depressions are located at spaced intervals that correspond to the locations of the indicia on the front face of the plate. In the embodiment shown, there are three scales on the front face of the plate with each scale traversing an arcuate path. Accordingly, the depressions 20 are arranged in three arcuate paths.

A plurality of thumbscrews 24 are spacedly located along the rear surface of leg 2. Each thumbscrew has a gnarled head 26 and a threaded body 28 that ends at rounded tip 30. The body is received within a threaded thru-bore in the rear portion of the leg. Any one of the screws may be adjustably positioned by the user to allow the screw's tip 30 to contact the rear surface of plate 12. Once the tip of the screw contacts the plate, it will act to stop or fix the leg at a point where the tip is received into one of the corresponding plate depressions 20. Therefore, the screws in combination with the depressions create detents that can be adjusted to interfere with or stop the movement of one leg relative to the other. It should be noted that each of the thumbscrews is used for a particular scale 14 and therefore acts on only a single curved path of depressions. In this manner, each of the thumbscrews is used to create detents for a particular scale.

A dial indicator 32 is removably secured to an upper portion of leg 4 by clamp 34. The dial portion of the indicator includes a face plate 36 that has at least one scale 38 arranged proximate its perimeter. The scale includes a plurality of reference indicia 40. When the measurement tool is to be used with leg tips that differ in length by only a matter of less than approximately twelve inches, it has been found that a single scale on the dial indicator can provide sufficient accuracy when making most measurements. When leg tips that are significantly different in length are to be used or when an extremely high degree of accuracy is required, the dial indicator will have multiple scales in a manner similar to plate 14 with each scale associated with a particular length of leg tip.

The dial indicator also includes a pointer 42 that moves in a clockwise direction when plunger 44 is depressed. The indicator has a gnarled outer grip 46 that is directly connected to the indicator face plate 36 and when moved, causes a corresponding movement of the scale relative to the pointer. In this manner, a "zero" indicia on the scale may be placed at any point within 360 degrees to coincide with a particular pointer position. A lockscrew assembly 48 is also provided on the exterior of the indicator to lock the grip 46 in place once the face plate has been properly positioned.

The indicator is actuated by any axial movement of the plunger 44. To apply pressure to the indicator plunger, an arcuately-shaped follower 50 is adjustably attached to leg 2.

Figure 5:
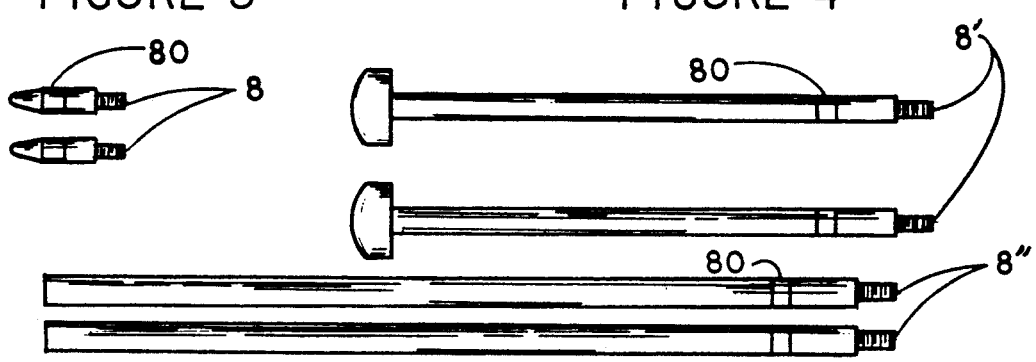
FIG. 5 shows a front view of three sets of removable tips that may be secured to the device's legs.

The follower has a flat head portion 52 and an elongated body portion 54. The body portion is slidably received within an adjustable clamp 56 that is rigidly secured to leg 2. A thumbscrew 58 is threadably mounted in the clamp to enable a user to adjustably apply pressure onto the body portion of the follower. When the thumbscrew is tightened down on the follower, this causes the follower to be fixedly secured to leg 2 in a manner whereby it can no longer slide within the clamp. Once the follower is secured, the location of its head portion relative to leg 2 becomes fixed. FIG. 5 provides a view of three sets of tips 8, 8' and 8" that may be threadably engaged to legs 2 and 4. Substitution of one set of leg tips for another enables a user to measure the inner diameter of a cylinder at different spaced locations along the cylinder's longitudinal axis.

Figure 6:
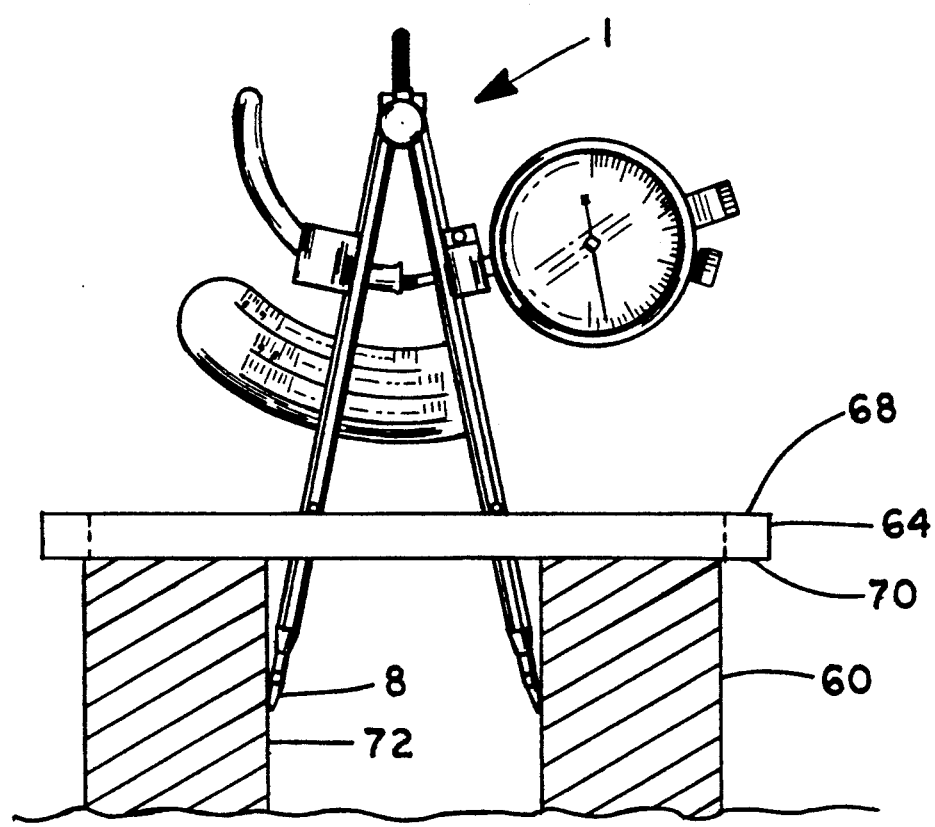
FIG. 6 provides a front view of the device resting atop a support block and positioned to measure the diameter of a cylinder.
Figure 7:
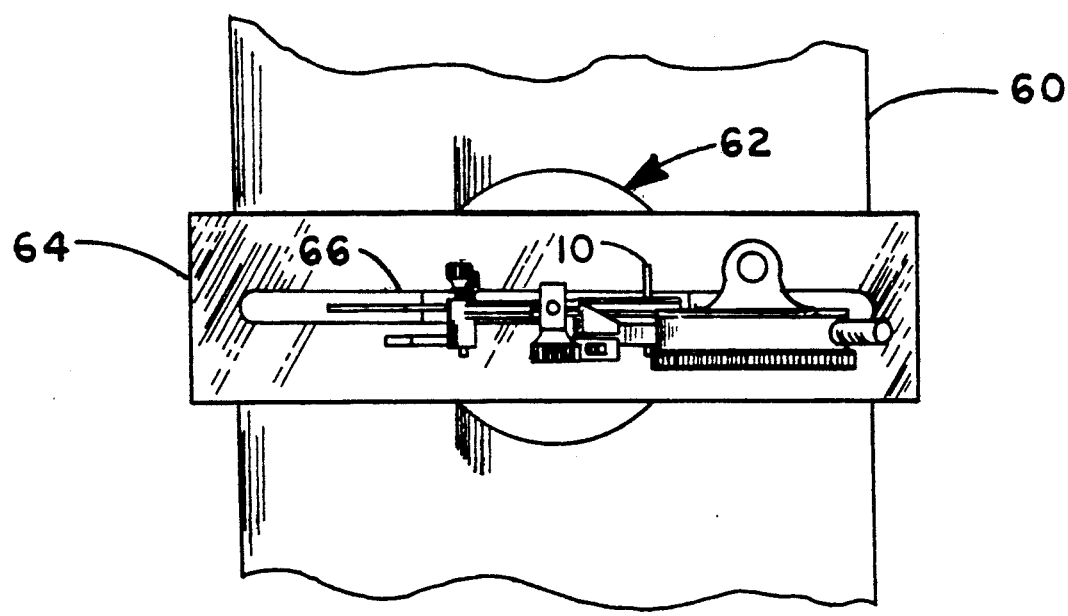
FIG. 7 provides a plan view of the measurement apparatus and cylinder shown in FIG. 6.

FIGS. 6 and 7 show the measuring apparatus located atop an engine block 60 that has at least one cylinder 62. The procedure for using the invention will now be detailed.

In normal practice, the measuring device 1 is used in combination with a support block 64. The support block is rectangular in shape and made of a heavy metal material such as steel. An elongated slot 66 extends longitudinally across the center of the block thereby providing a long thru-aperture between the block's top and bottom faces, 68 and 70 respectively. The faces 68 and 70 are smooth and flat thereby each forming a planar surface.

When a measurement of an interior diameter is to be made, the support block is placed atop the cylinder as shown with the slot 66 extending in a direction across the cylinder. For best results, the support block is precleaned prior to use. The cylinder 62 should also be clean and preferably lightly honed prior to the measurement being made. The presence of dirt or grit on the surfaces can reduce the accuracy of the measurement.

Initially, the support block is placed in a position where slot 66 is aligned slightly to the side of a position where it would diametrically cross the bore. In the described position, the slot will cross the bore as a chord of the circle formed by the perimeter of the bore. The user then installs the proper tips into the measuring tool's legs (short tips 8 for measuring the diameter near the top of the cylinder and longer tips 8' or 8" for measuring the diameter deeper within the cylinder). Next, the legs of the tool are partially inserted through the slot of the support block until support pin members 10 contact the block's upper surface 68. The pin members 10 function to support the measuring tool 1 on the block in a manner wherein the tool is substantially perpendicular to the block's upper surface thereby ensuring that the tool remains level throughout the measurement process.

The user then spreads the tool's legs apart using a forefinger and thumb. The legs are moved outwardly until the leg tips 8 contact the cylinder s interior surface 72. At this point, if viewed from above, the device can be seen as traversing a chord of the circle that is formed by the perimeter of the bore.

Once the tool has been properly positioned, the user checks that the thumbscrews 24 are backed-off so that none of their tips 30 are contacting the depressions 20 in plate 12. The follower 50 is now adjusted so that it substantially fully depresses the indicator plunger 44. The follower is secured in this position by tightening thumbscrew 58.

While maintaining an outward force on the tool's legs with a thumb and forefinger, the user then slides the block gently across the center of the cylinder. By watching the pointer on the dial indicator, the user can easily determine when the tool is located in a position where it is measuring the bore's true diameter. As the legs open outwardly, the pointer moves in a counter-clockwise direction. At the widest point of spread (the diameter position), the pointer will stop its movement. As the center of the block goes past the location of the diameter, the legs will begin to be pushed inwardly (toward each other) and the pointer will again start to rotate but this time in a clockwise direction. The user will then move the block back to the point where the pointer stops before changing its direction of rotation. The tool is now in position and opened (legs spread) to a point where it can be used to measure the true diameter of the cylinder bore.

To measure the diameter of the bore, the user initially slightly tightens the thumbscrew 24 that is associated with the scale 14 and particular length leg tip being used. The legs are then gently moved toward each other (away from the cylinder wall) until the thumbscrew 24 contacts a plate depression. The user then makes a note of the indicia 18 (of the applicable scale 14) that is located adjacent the inner edge 74 of leg 2. This is the initial "coarse" measurement of the diameter. The face of the dial indicator is then adjusted so that the tip of the pointer is at the "zero" indicia on the indicator face. The follower position may require readjustment prior to zeroing of the pointer to ensure that the plunger is sufficiently depressed to enable the following "fine" portion of the cylinder measurement.

The thumbscrew 24 is then loosened and outward pressure is again exerted on the tool's legs by the user's thumb and forefinger. The legs are moved apart until their tips again contact the cylinder wall. The outward movement of the legs caused the pointer 42 to rotate in a counter-clockwise direction. The pointer is now pointing at the indicia that indicates the distance that the legs have moved outwardly from their prior position (where the coarse measurement was made). For example, if the coarse measurement was 4.0 inches and the pointer of the dial indicator is now pointing to the 0.132 indicia (i.e. −0.132 inches), this indicates that the legs have been moved outwardly 0.132 inches past the 4.0 inch position. The true cylinder diameter measurement is therefore 4.0 plus 0.132 inches or 4.132 inches total.

Once the above measurement has been completed, the user will normally rotate the measurement apparatus (including the block) ninety-degrees from the previous measurement location and repeat the measurement process. This second measurement will provide the user with the necessary information to determine if an out-of-round cylinder condition exists.

To check that the cylinder diameter is constant throughout the axial length of the bore (i.e.- from the top to the bottom of the cylinder), a user can remove the first leg tips used and substitute in their place longer or shorter tips for the legs. This enables the user to take diameter measurements at a number of different cylinder depths. In this manner, the user can quickly determine if there is uneven or unusual wear at different depths along the cylinder's longitudinal axis. For example, by taking measurements at various depths, it can rapidly be determined if a cylinder has become conically tapered.

When different length leg tips are used, the user should use the correct scale 14 for the particular tips being used. For example, when the short tips 8 are used, the top scale on plate 12 would be used. For the longest tips, the bottom scale would be chosen. To simplify the determination of the proper scale to use, the legs and scales are preferably color coded. As can be seen in FIG. 5, each of the tips has a band area 80. Each set of tips will preferably have a band area of the same color. In addition, the band color of each set of tips will be different from that used on the other sets of tips. For example, if the shortest tips have a band area that is silver colored, the medium length tips may have a red colored band area and the longest tips have a blue colored band area. Each associated scale 14 will preferably have indicia 18 or other markings that are colored in accordance with the band area of the associated tips i.e.-the scale that is used with the short tips will have silver-colored indicia or marking(s).

The embodiment disclosed herein has been discussed for the purpose of familiarizing the reader with the novel aspects of the invention. Although a preferred embodiment of the invention has been shown and described, many changes, modifications and substitutions may be made by one having ordinary skill in the art without necessarily departing from the spirit and scope of the invention as described in the following claims.

I claim:
1. A measuring apparatus comprising:
   a bifurcated tool having first and second legs wherein each of said legs has a top portion and a bottom portion and wherein the top portions of said legs are operatively connected thereby allowing the legs to move relative to each other;
   a scale member operatively connected to one of said legs of said tool and wherein said scale member includes a plurality of spaced measurement indicia;
   a dial indicator means operatively connected to said first leg of said tool wherein said dial indicator means includes a movable plunger, a pointer means and measurement indicia wherein movement of said plunger causes a corresponding movement of said pointer means relative to the indicia of the dial indicator means;
   an arcuately-shaped follower means slidably connected to said second leg of said tool by an adjustable securing means, said follower means having an elongated curved body and a flat head portion wherein said securing means can be adjusted to allow the head portion of said follower means to be moved to contact the plunger of the dial indicator means at a plurality of different orientations of the legs of said tool.
2. The measuring apparatus of claim 1 further comprising:
   a support member in each of said legs of said tool wherein said support member extends perpendicularly to a longitudinal axis of each associated leg; and
   a support block that includes an elongated thru-bore that extends between an upper and lower face of said block and has a predetermined width that will allow the bottom portion of each of said legs of said tool to pass through said block but will not allow the support members to pass through said block.

3. The measuring apparatus of claim 1 wherein a removable tip member of a first length is attached to the bottom portion of each leg of said tool.

4. The measuring apparatus of claim 3 further comprising:
a plurality of interchangeable tip members of different lengths thereby enabling a user to substitute tip members of different lengths in the bottom portions of the legs of the tool thereby enabling the apparatus to be used to determine distance measurements at different locations along a longitudinal axis of a cylinder bore; and
wherein the scale member includes a plurality of measurement scales with each of said scales being associated with the use of a particular length of tip member on the legs of the tool.

5. The measuring apparatus of claim 4 wherein each of said tip members includes on its exterior surface a reference indicia indicative of the tip member's length and wherein each of the scales located on the scale member includes indicia that indicate which of the tip members are associated with any particular one of the scales.

6. The measuring apparatus of claim 1 further comprising:
an adjustable detent means operatively connected to said first and second legs of said tool wherein said detent means includes a first portion located on the scale member and a second portion located on one of said legs of said tool wherein said detent means functions to releasably arrest the movement of one of the tool s legs relative to the other leg at a plurality of predetermined positions.

7. The measuring apparatus of claim 6 wherein said detent means is in the form of an arcuately shaped path of depressions located on a rear face of said scale member and a complementary movable contact member located on one of said leg members wherein a user can adjustably move the contact member to a position where an end of the contact member can contact one of said depressions.

8. A measuring apparatus comprising:
leg member having a top end and a bottom end;
a first
a second leg member having a top end and a bottom end;
a pivot means that pivotally connects the top end of said first leg member to the top end of said second leg member;
a first measurement means comprising a scale member secured to one of said first or second leg members wherein said scale member has a front face and a rear face and includes a plurality of indicia on its front face that indicate a measurement of the distance between the bottom ends of said first and second leg members;
a second measurement means, said second measurement means being connected to said first leg member and wherein said second measurement means is in the form of a dial indicator that includes a movable actuator; and
an arcuately shaped follower member slidably secured to said second leg member by an adjustable clamp means, said follower member having an elongated curved body portion and a flat head portion and wherein said follower member can be moved within said clamp means to allow repositioning of said head portion of said follower member relative to a side edge of said second leg member to maintain the follower member in a location where its head portion contacts the actuator of said dial indicator in any of a plurality of different leg orientations.

9. The measuring apparatus of claim 8 further comprising:
first and second tip members wherein said first tip member is removably secured to the bottom end of said first leg member and said second tip member is removably secured to the bottom end of said second leg member and wherein said first and second tip members are of an equal length.

10. The measuring apparatus of claim 9 further comprising:
third and fourth tip members that can be removably secured to the bottom ends of said first and second leg members and thereby be substituted for said first and second tip members and wherein said third and fourth tip members are equal to each other in length and are longer in length than said first and second tip members ; and
at least two separate measurement scales of indicia on the front face of the scale member with one scale being associated with the use of said first and second tip members and a second scale associated with the use of said third and fourth tip members.

11. The measuring apparatus of claim 10 wherein each of said tip members includes on its exterior surface a reference indicia indicative of the tip member's length and wherein each of the scales located on the scale member includes indicia that indicate which of the tip members are associated with any particular one of the scales.

12. The measuring apparatus of claim 8 further comprising: an
adjustable detent means operatively connected to said first and second leg members wherein said detent means includes a first portion located on the scale member and a second portion located on one of said leg members wherein said detent means functions to releasably arrest the movement of one leg member relative to the other at a plurality of predetermined positions.

13. The measuring apparatus of claim 12 wherein said detent means is in the form of an arcuately shaped path of stops located on a rear face of said scale member and a complementary member located on one of said leg members.

14. The measuring apparatus of claim 8 further comprising:
a rectangular support block member that includes a flat top surface, a flat bottom surface and an elongated slot that extends between said top and bottom surfaces;
a first pin member located on said first leg member between the leg member's top and bottom ends, said pin member extending outwardly from said leg member in a direction perpendicular to a longitudinal axis of said leg member;
a second pin member located on said second leg member between the leg member's top and bottom ends, said pin member extending outwardly from said leg member in a direction perpendicular to a longitudinal axis of said leg member; and wherein said slot in said support block member has a width that is sized to allow a bottom portion of each of said first and second leg members to pass through said slot and wherein said first and second pin members have a length that is greater than the width of said slot and are oriented in a manner whereby when the bottom portions of said first and second legs are inserted through the slot in the support block, the thru-travel of the legs is arrested when the pin members contact the top surface of the support block.

* * * * *